Feb. 9, 1965    L. R. REY    3,169,049
CONTROL DEVICE FOR VACUUM FREEZE DRYING SYSTEMS
Filed Dec. 1, 1961    3 Sheets-Sheet 1
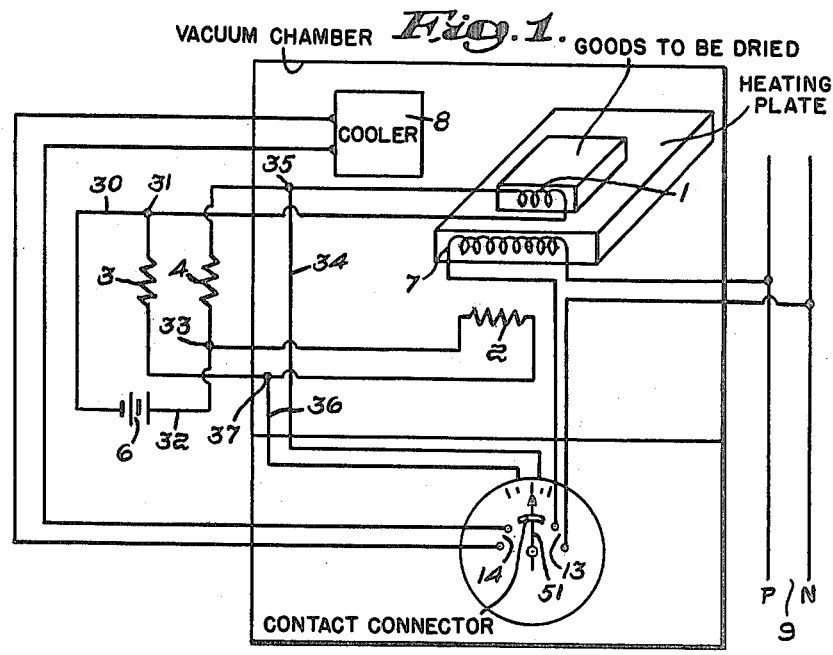
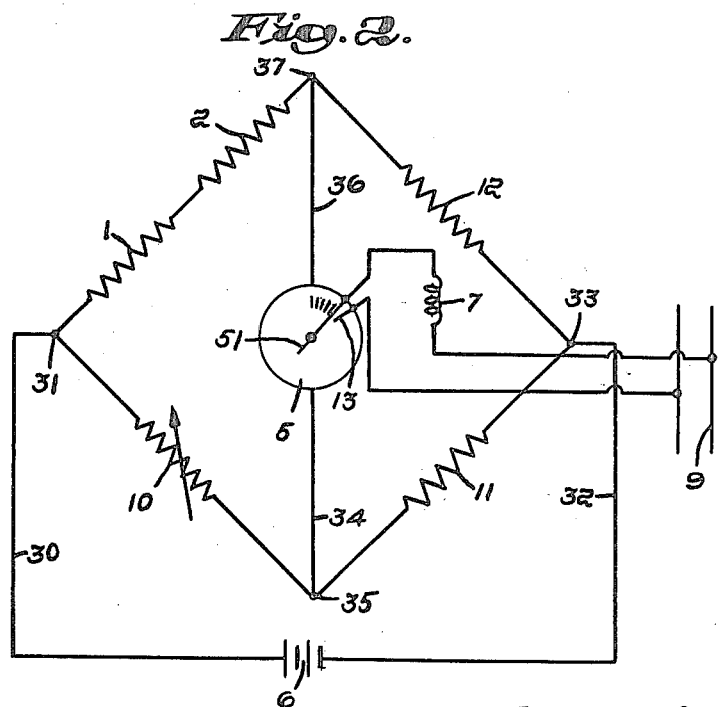
Inventor:
Louis R. Rey 3,169,049
CONTROL DEVICE FOR VACUUM FREEZE
DRYING SYSTEMS
Louis R. Rey, St. Cloud, France, assignor, by mesne assignments, to Leybold-Anlagen Holding A.G., Zug, Switzerland
Filed Dec. 1, 1961, Ser. No. 156,259
Claims priority, application Germany Dec. 1, 1960
16 Claims. (Cl. 34—5)

The present invention relates generally to control devices, and, more particularly, to such a device which is used for controlling the temperature of a vacuum freeze drying operation by connecting or actuating either heating or cooling elements into the operation by means of a Wheatstone type electric bridge circuit using temperature-responsive resistors in the arms of the bridge.

Vacuum freeze drying processes provide a particularly gentle drying operation and are therefore especially suitable for sensitive substances. Such processes are carried out by first freezing the goods to be dried, and then placing them in a high vacuum chamber, where sublimation of the frozen constituents takes place, so that at the termination of the drying process there remain dry articles having porous structures. For reasons of economy, the process in a freeze drying plant should operate with the shortest possible drying time. Efforts have been made to retain the frozen goods which are to be dried, at a temperature at which the ice sublimation will proceed in its desired manner, even though the sublimation is enhanced by heating, in order to shorten the drying process.

Therefore, heating devices are used, mostly in the form of electrically heated support plates, with support vessels containing the frozen goods, and a suitable amount of heat may be supplied to the goods by heat transfer. Other heating devices are known wherein the heat transfer takes place by radiation.

The control of the temperature of these heating devices is a particularly difficult problem because on the one hand there must be a sufficient amount of heat to increase the drying speed and to reduce the time required to a minimum, while on the other hand excessive heat causing an increase of the temperature above the permissible value must be definitely avoided. The reason is that in this event there may be partial thawing of the goods, which could very well cause destruction or damage to the goods to be dried. It should be noted that the freeze drying process has a characteristic whereby at first the ice in the surface layers of the goods is sublimated so that there is an inner core which contains ice. This core recedes more and more during the course of the drying process and eventually disappears altogether. The portion of the goods which is already in the dry state may usually be exposed to higher temperatures than the ice-containing core, and this factor is essential to the correct design and utilization of the heating device.

Devices have been proposed in the past wherein the heating elements are kept at a constant temperature by means of a special control device. A known auxiliary means in the measuring and controlling art, are the so-called bridge circuits, such as those of the Wheatstone type, which are already used for solving various control problems even when non-electrical parameters are involved. In the basic principle of this type of control means, temperature-responsive resistors are provided in the arms of the bridge, and the temperature values of the resistors are influenced by the non-electric parameters to be measured and controlled. The final controlled state assumes balancing of the bridge and thus elimination of the current in the indicating diagonal of the bridge.

A main object of the present invention is to provide a control device which is particularly suitable for accurately controlling the temperature freeze drying operations.

Another object of this invention is to provide a device of the character described which protects the sensitive measuring and controlling device from electrical overload.

These objects and other ancillary thereto are accomplished according to preferred embodiments of the invention, wherein a bridge circuit, using temperature-responsive resistors in the arms thereof, is provided to actuate heating or cooling elements when needed. A first temperature-responsive resistor is provided in the goods or articles to be dried, and a second temperature-responsive bridge resistor is provided in the immediate vicinity of a heating element. The remaining bridge resistors have resistance values which are independent of external temperature variations. Thus, the temperature values of the goods to be dried and the heating device act on the equilibrium of the bridge in opposite senses. A measuring system is provided in the indicating diagonal of the bridge and is arranged to actuate the heating elements or the cooling elements by closing a circuit in the event of sufficient disharmony in the current at the connecting points of the diagonal.

The first temperature-responsive bridge resistor should be placed in a representative sample of the goods to be dried. Appropriate resistors may be combined in several samples if desired, but should be connected to form one common temperature-resistance value. The temperature-responsive resistors in the bridge may be provided in the same arms thereof or in different arms. Generally, the arrangement in opposite arms of the bridge is preferable because of the better adjustment of the temperature response of the heating device to the temperature response of the goods to be dried, with respect to the desired reduction of the time required for the drying operation.

The arrangement of two temperature-responsive bridge resistors in opposite bridge arms provides an especially favorable result with respect to the control curve which is desired. The shape of this curve may be influenced by using resistors with other types of temperature responses, such as those having a lower temperature coefficient of resistance or even a negative temperature coefficient of resistance. If the two temperature-responsive bridge resistors are provided in the same arm of the bridge, then only one linear characteristic or curve is possible and generally a less sensitive control will be provided. Moreover, in such an event, only the heating device can be switched into operation and not the cooling device.

Since, under certain circumstances, there is a great unbalancing of the bridge circuit when the control device is switched on, the current in the indicating diagonal resulting therefrom could possibly damage a very sensitive measuring system. Accordingly, a sensitive measuring system may be protected from overload by a protective circuit device. This device may be arranged so that a relatively insensitive first measuring system, which is initially placed into operation, switches a reversing relay via terminal switching contacts which switch a second and more sensitive system into the indicating diagonal of the bridge as the bridge approaches the balanced state. In addition, this reversing relay replaces the second measuring system by a resistor of identical value. This resistor is connected in parallel with the first measuring system when the current in the indicating diagonal in either direction exceeds the permissible value for the second measuring system.

As a further embodiment, another advantage and simplification of this device may be obtained by using the resistance of the heating coil of the heating elements as the electric resistors. An amplifier element, preferably a transistor amplifier, may also be provided in the indicating diagonal to increase the sensitivity.

The temperature-independent resistors may be constructed of a material having a very low temperature coefficient of resistance. If the ambient temperature is stabilized by using thermostats, then even resistors with higher coefficients will suit the purpose. These temperature-independent resistors may be constructed as adjustable potentiometers and, if desired, connected in a tandem arrangement, which provides a very simple adjustment of the desired final temperature of the goods which are to be dried.

The novel control device of the present invention may directly control the temperature of the goods to be dried by measuring the inherent or interior resistance of these goods, or may indirectly control the temperature by pressure measurement, in which case the pressure values would be converted into corresponding resistance values. As is known, the temperature of the goods to be dried may be determined, after a given time interval, from the values of pressure which are attained in the vacuum drying chamber which is temporarily and completely sealed. The conversion of these values of pressure into values of resistance may be accomplished by remote control devices through pressure rollers which are known per se.

Additional objects and advantages of the present invention will become apparent upon consideration of the following description when taken in conjunction with the accompanying drawings in which:

FIGURE 1 is a schematic showing of a freeze drying installation utilizing a bridge circuit having temperature-responsive bridge resistors in opposite bridge arms.

FIGURE 2 is a circuit diagram of a bridge circuit wherein the temperature-responsive bridge resistors are in the same arm of the bridge.

Figure 3:
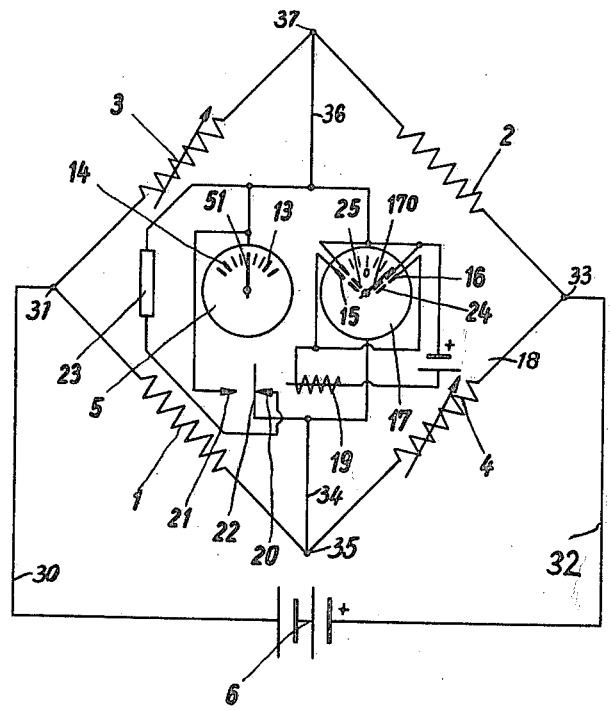
FIGURE 3 is another circuit diagram of a bridge circuit similar to FIGURE 1 but with a protective circuit provided for the sensitive measuring system.

With more particular reference to the drawings, FIGURE 1 illustrates an embodiment of a control device for a freeze drying installation. Positioned in a vacuum chamber is a first temperature-responsive resistor 1 connected in one arm of a bridge circuit, and a second temperature-responsive resistor 2 in an opposite arm of the bridge. The temperature-responsive resistor 1 is located in a representative sample of the goods or articles to be dried, while the second temperature-responsive resistor is provided in the immediate vicinity of an electric heating coil 7 of a heating plate.

Positioned outside the vacuum chamber are temperature independent resistors 3 and 4 which are connected in the other arms of the bridge. This independence from ambient temperature may be achieved by arranging these resistors in or near a thermostat (not shown) having an adjustable temperature. Resistor 1 is connected with resistors 3 and 4 and with a feeding line 30, by connection 31. Resistor 2 is connected with the other ends of resistors 3 and 4 and with a feeding line 32 at connection 33. A source of D.C. voltage 6 is connected with feeding lines 30 and 32 to supply the bridge with electrical energy.

Resistors 1 and 4 are connected together and with a line 34 at point 35. Resistors 2 and 3 are connected together and with a line 36 at point 37. A measuring system 5 is disposed between lines 34 and 36 and thus between points 35 and 37. The circuitry between these latter points is considered the indicating diagonal. The measuring system 5 provided in the indicating diagonal, has terminal switching contacts 13 and 14 which are switched to closed positions by means of a movable contact connector 51. When the terminal switching contacts 13 are closed, they connect the electric heating coil 7 with the current supply network 9. When the terminal switching contacts 14 which are located at the opposite terminal position from contacts 13, are closed, they set a cooling assembly 8 into operation which also acts upon the goods to be dried.

In a suitable embodiment of the invention, the electric heating coil 7 should be arranged and appropriately distributed in a metallic support plate, so as to provide heat for the goods to be dried which are located in containing vessels disposed on these plates. Refrigerating lines, which are supplied by cooling assembmly 8, are also arranged in these support plates. Thus, the goods to be dried may be subjected to the desired temperature effect depending upon whether the heating or the cooling system of the plates is placed into operation.

As an example to illustrate the control process, it will be assumed that the Wheatstone bridge has resistors in the arms thereof which are 100 ohms at 30° C. The resistors in a bridge branch and in the corresponding opposite branch are constructed of platinum wire having a temperature coefficient of resistance which is as close to being linear as possible in the range of −100° C. to +100° C. One of these platinum wire resistors will be disposed in the representative sample of the goods to be dried, while the other wire or resistor is arranged in the vicinity of a heating element, so that its resistance is determined by the temperature of said heating element. These resistors may be considered as being the resistors 1 and 2, respectively, of FIGURE 1.

The two remaining resistors 3 and 4 of 100 ohms may be housed in a thermostat having an interior temperature of 30° C. This temperature is the limiting value of the product temperature to which the entire process will be adjusted at the termination of the drying process.

According to the principle of electrical bridges, current in the indicating diagonal will disappear if $R_1R_2=R_3R_4$, where the sub numerals indicate the resistors of FIGURE 1. Thus, with the resistor values of 100 ohms, the bridge equilibrium condition is attained when all of the resistors are at 30° C. At the initiation of the vacuum freeze drying operation, the temperature of the frozen goods to be dried in about −50° C. and therefore resistor $R_1$ assumes a value of 68 ohms. In order to provide equilibrium of the bridge in this instance, the resistor $R_2$ in the opposite bridge arm must have a value of 147 ohms. This is accomplished if the coil 7 of the heating device attains a temperature of 147.5° C. Thus, due to the originally mentioned unbalance the heating device may be switched on through the terminal contacts 13 of measuring system 5 in the indicating diagonal of the bridge. The bridge will then approach a state of equilibrium with a constant temperature of the frozen product when the temperature of heating coil 7 has attained the indicated relative high value, which, at the same time, assures good transfer of heat.

Therefore, the heating is particularly intensive at the beginning of the vacuum freeze drying process, as long as the goods to be dried are at very low temperatures. Since this heating during the course of the sublimation action causes the temperature of the goods to rise slowly, a proportional variation of resistor $R_1$ causes another disturbance in the equilibrium of the bridge which may be counteracted by a corresponding reduction of the temperature of heating coil 7.

When the goods to be dried attain a temperature of 0° C., the equilibrium condition is attained when the heating device is at a temperature of 62.5° C. The final balancing is attained when the goods attain a temperature of 30° C., at which time the heating device will have a corresponding or identical temperature. In this manner the heating temperature of the heating coil 7 is automatically adjusted to the temperature prevailing at any given moment. The terminal contacts 13, which are controlled by the measuring system 5 in the indicating diagonal, switch the heating coil 7 into or out of operation, that is, provide electrical energy to the heating device. If, for any reason, such as there being heat at the start of the heating system, or too intensive an increase in the temperature of the goods, the bridge equilibrium is disturbed in the opposite direction, current in the indicating diagonal will reverse its direction, so that the measuring system 5 will move to and close the opposite terminal contacts 14 which will supply electrical energy to the cooling assembly 8.

When the bridge is balanced, at the uppermost temperature to which the device may be adjusted, the adjusting element 51 of measuring system 5 will be in its central position between the terminal switching contacts 13 and 14 so that neither the heating nor the cooling assemblies will come into operation. However, this state of equilibrium is attained only at the termination of the drying process. At the initiation of the process, there is a great unbalance in the bridge because of the different temperatures prevailing at the termperature-responsive resistors 1 and 2. Therefore, adjusting element 51 will close the contacts 13 by striking them and thus set the heating coil 7 into operation. The action of this coil upon the temperature-responsive resistor 2 will cause the bridge to approach its balanced state. When there is an excess of heat, the current in the indicating diagonal will reverse its direction and the adjusting element 51 will therefore move in the opposite direction against the other terminal switching contacts 14 and actuate the cooling assembly 8, causing a cooling of the goods through appropriate heat exchange elements.

Another embodiment of the invention is illustrated in FIGURE 2, wherein the two temperature-responsive resistors 1 and 2 are disposed in the same arm of the bridge circuit between points 31 and 37. The remaining bridge resistors 10, 11, and 12 are temperature-independent and may be constructed of material having a low temperature coefficient of resistance. A D.C. voltage source 6 is provided to feed the bridge at points 31 and 33, and the switching process is initiated from the measuring system 5 in the indicating diagonal. Since, in this embodiment, only control of the heating takes place, only the single set terminal switching contacts 13 for controlling the heating are provided, and the other contacts are omitted. Contacts 13, in this case also are closed by means of the adjusting element 51 to connect the electric heating coil 7 with the current supply network 9.

Another embodiment is illustrated in FIGURE 3. This embodiment is provided with a protective device to protect the control measuring system from overload. The embodiment is basically the same as that of FIGURE 1. However, the resistors 3 and 4, which are used for adjusting the upper temperature limit and which are temperature independent due to the material of which they are constructed, are designed as potentiometers in this embodiment. A first measuring system 17 is provided within the indicating diagonal. This system has a sensitivity which is considerably less than that of the second measuring system 5, and the ration of sensitivity may be 1:10, for example.

This first measuring system 17 includes reversing switch contacts 15 and 16 which operate a reversing relay 19. This circuit is provided with energy by means of a source of electricity 18. Also, this first measuring system 17 has two sets of terminal switching contacts 24 and 25 disposed at opposite ends of the range, and which are connected in parallel with the corresponding terminal switching contacts 13 and 14 of the second measuring system 5. In order to simplify this wiring diagram the corresponding connecting wires and lead wires to the heating coil and the cooling assembly have been omitted, although they correspond closely with those of FIGURE 1.

The relay switching armature 22 of the reversing relay 19 abuts against a first reverse contact 20 when the reversing relay 19 is connected with the voltage source 18 by one of the two sets of reversing switching contacts 15 or 16. Thus, the second measuring system 5, which is connected to a second reversing contact 21, is separated from the voltage of the bridge diagonal. The first reversing contact 20 replaces system 5 by placing an ohmic resistor 23 into the indicating diagonal. The value of this ohmic resistor corresponds to the inherent resistance of the second measuring system 5 and is connected in parallel with the measuring system 17 which is permanently connected into the circuit.

When the bridge approaches the balanced condition, the further adjusting element 170 is moved from its final position, in which it has kept the switching contacts 16 and the terminal switching contacts 24 closed, or the reversing switching contacts 15 and its terminal switching contacts 25 closed. When this occurs, the current of the reversing relay 19 is interrupted, thus causing the switching armature to be moved against the second reversing contact 21 by spring force. Thus, the more sensitive measuring system 5 is switched into the indicating diagonal and assumes the fine adjustment for the energy supply together with its terminal switching contacts 13 and 14. By disconnecting the connection of the first reversing contact 20 from the switching armature 22, the ohmic resistor 23 is disconnected from the bridge diagonal.

By means of the parallel connection of the terminal contacts 13, 24, and 14, 25 there is continuous control of the energy supply in either case, independently of which of the two measuring systems assumes control of the process according to the value of the current in the indicating diagonal.

Under certain circumstances, it is preferable to protect the more sensitive second measuring system, which is switched off only by the first measuring system, from the switching pulse by means of a capacitor which may be connected in parallel, or by an inductance which may be connected in series.

Figure 4:
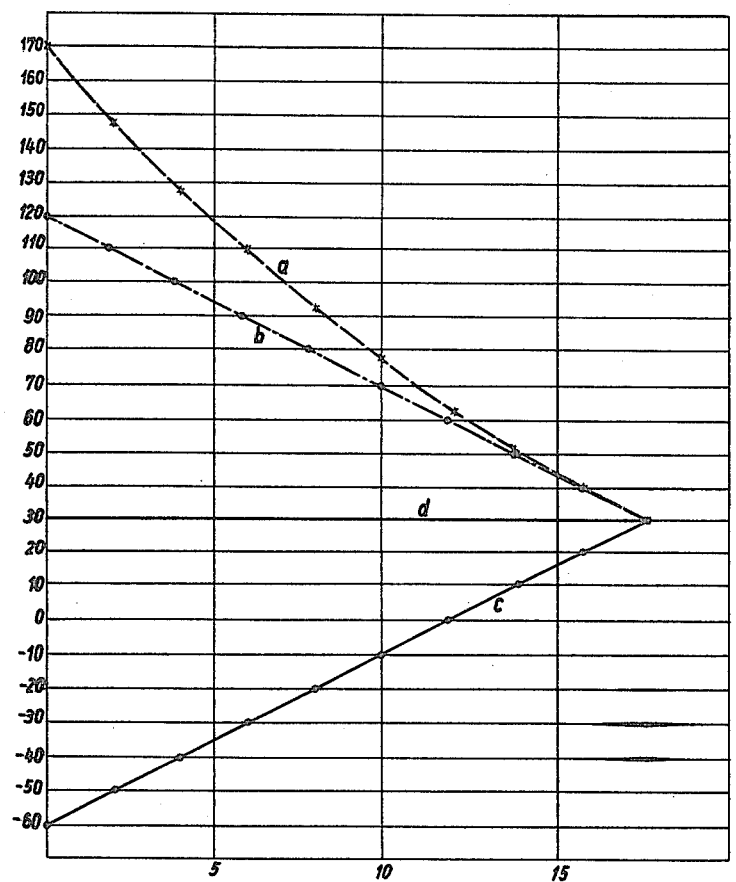
FIGURE 4 is a graph of the temperature response of the goods to be dried and of the heating device.

FIGURE 4 illustrates graphs of the temperature responses which are provided in the various embodiments, both for the heated section and for the cooled section thereof. The curve $a$ indicates the temperature response of the electrically heated support plate in the embodiments of a bridge circuit according to FIGURES 1 or 3. Curve $b$ indicates the temperature response of the support plate when a bridge circuit according to the embodiment of FIGURE 2 is used, wherein both of the temperature-responsive resistors are disposed in the same arm of the bridge. The curve $c$ indicates the temperature response of the goods to be dried. The horizontal line $d$ indicates the temperature equilibrium condition which the temperature of the goods to be dried and the temperature of the support plates approach both from above and below, respectively, under the influence of the control by means of heating and cooling.

If desired these bridge circuits which are shown may be operated with alternating current, in which case rectifier elements should be connected in series with the measuring system or systems.

It will be understood that the above description of the present invention is susceptible to various modifications, changes, and adaptations, and the same are intended to be comprehended within the meaning and range of equivalents of the appended claims.

What is claimed is:

1. A control device for a vacuum freeze drying system, comprising, in combination:
    (a) means for heating goods to be dried in a vacuum freeze drying system;
    (b) means for cooling goods to be dried in a vacuum freeze drying system;
    (c) a source of energy for actuating said heating means and said cooling means when connected thereto; and
    (d) measuring and controlling means connected with said heating means, said cooling means, and said source of energy for selectively connecting said heating means and said cooling means with said source of energy to selectively actuate them, said measuring and controlling means including
   (1) a first temperature-responsive resistor adapted to be arranged in the goods to be dried,
   (2) a second temperature-responsive resistor disposed in the immediate vicinity of said heating means, and
   (3) further resistors having temperature-independent resistance characteristics, said resistors being connected together to form an electric bridge circuit of the Wheatstone type.

2. A device as defined in claim 1, wherein said temperature-responsive bridge resistors are disposed in opposite arms of the bridge.

3. A device as defined in claim 1, wherein said measuring and controlling means include a measuring system in the indicating diagonal of the bridge having two sets of switching contacts, one for connecting said heating means and the other for connecting said cooling means with said source of energy.

4. A device as defined in claim 3, wherein said measuring and controlling means include a protective circuit device to protect said measuring system from overload.

5. A device as defined in claim 1, wherein said measuring and controlling means include a first relatively insensitive measuring system and a second relatively sensitive measuring system, both being connected in the indicating diagonal of said bridge, and a protective circuit to protect said sensitive measuring system from overload, said first measuring system being permanently connected in the indicating diagonal, a substitute resistor having the same resistance as said sensitive measuring system, a reversing relay having a set of contacts including one contact for connecting said sensitive measuring system in the indicating system and another contact for connecting said resistor in the indicating diagonal in parallel with said first measuring system, said first measuring system having terminal switching contacts controlling operation of said reversing relay, whereby when current in the indicating diagonal exceeds the predetermined permissible value for the second measuring systems, said second sytsem is disconnected.

6. A device as defined in claim 1, comprising a thermostat in which said further resistors are disposed.

7. A device as defined in claim 1, wherein said temperature-responsive resistors have positive temperature coefficients of resistance, additional resistors in the same bridge arms as said temperature-responsive resistors and having negative temperature coefficients of resistance.

8. A device as defined in claim 1, comprising an amplifier element in the indicating diagonal of the bridge.

9. A control device for a vacuum freeze drying system, comprising, in combination:
  (a) means for heating goods to be dried in a vacuum freeze drying system;
  (b) means for cooling goods to be dried in a vacuum freeze drying system;
  (c) a source of energy for actuating said heating means and said cooling means when connected thereto; and
  (d) measuring and controlling means connected with said heating means, said cooling means, and said source of energy for selectively connecting said heating means and said cooling means with said source of energy to selectively actuate them, said measuring and controlling means including
   (1) a first temperature-responsive resistor adapted to be arranged in the goods to be dried,
   (2) a second temperature-responsive resistor disposed in the immediate vicinity of said heating means,
   (3) further resistors having temperature-independent resitsance characteristics, said resistors being connected together to form an electric bridge circuit of the Wheatstone type,
   (4) a measuring device connected in the indicating diagonal of the bridge for indicating the amount and the direction of current flow in said diagonal, and
   (5) a pair of switches for connecting said heating means and said cooling means with said energy source when closed, said switches being arranged to be opened and closed by said measuring device.

10. A control device for a vacuum freeze drying system, comprising, in combination:
  (a) means for heating goods to be dried in a vacuum freeze drying system;
  (b) a source of energy for actuating said heating means when connected thereto; and
  (c) measuring and controlling means connected with said seating means and said source of energy for selectively connecting said heating means with said source of energy to selectively actuate same, said measuring and controlling means including
   (1) a first temperature-responsive resistor adapted to be arranged in the goods to be dried,
   (2) a second temperature-responsive resistor disposed in the immediate vicinity of said heating means, and
   (3) further resistors having constant resistance characteristics, said resistors being connected together to form an electric bridge circuit of the Wheatstone type.

11. A device as defined in claim 10, wherein said temperature-responsive resistors are arranged in the same arm of the bridge.

12. A device as defined in claim 11, wherein said measuring and controlling means include a measuring system, and a protective circuit to protect said measuring system from overload.

13. A control device for a vacuum freeze drying system, comprising, in combination:
  (a) means for heating goods to be dried in a vacuum freeze drying system and including a heating coil;
  (b) means for cooling goods to be dried in a vacuum freeze drying system;
  (c) a source of energy for actuating said heating means and said cooling means when connected thereto; and
  (d) measuring and controlling means connected with said heating means, said cooling means, and said source of energy for selectively connecting said heating means and said cooling means with said source of energy to selectively actuate them, said measuring and controlling means including
   (1) a first temperature-responsive resistor adapted to be arranged in the goods to be dried,
   (2) a second temperature-responsive resistor defined by said heating coil of said heating means, and
   (3) further resistors having temperature-independent resistance characteristics, said resistors being connected together to form an electric bridge circuit of the Wheatstone type.

14. In a control device for controlling the temperature of goods in a vacuum freeze drying assembly including means for heating by a heating element or for cooling the goods, a source of energy for actuating the heating or cooling means, and an electric control Wheatstone bridge circuit including temperature-responsive resistances for connecting the heating or cooling means with the energy source, the improvement wherein: a first temperature-responsive bridge resistance is arranged in the goods to be dried, a second temperature-responsive bridge resistance is in the immediate vicinity of a heating element, and the remaining bridge resistances having values which are independent of external temperature variation.

15. The device of claim 14, comprising a thermostat in which said remaining resistances are disposed.

16. A control device for a vacuum freeze drying system, comprising, in combination:
(a) means for heating goods to be dried in a vacuum freeze drying system;
(b) means for cooling goods to be dried in a vacuum freeze drying system;
(c) a source of energy for actuating said heating means and said cooling means when connected thereto; and
(d) measuring and controlling means connected with said heating means, said cooling means, and said source of energy for selectively connecting said heating means and said cooling means with said source of energy to selectively actuate them to gradually lower the temperature of said heating means as the temperature of the goods to be dried increases, said measuring and controlling means including
(1) a first temperature-responsive resistor arranged in the goods to be dried,
(2) a second temperature-responsive resistor disposed in the immediate vicinity of said heating means, and
(3) further resistors having temperature-independent resistance characteristics, said resistors being connected together to form an electric bridge circuit of the Wheatstone type.

References Cited in the file of this patent
UNITED STATES PATENTS

| | | |
|---|---|---|
| 2,366,500 | Eastin | Jan. 2, 1945 |
| 2,533,125 | Levinson | Dec. 5, 1950 |
| 2,803,888 | Cerletti | Aug. 27, 1957 |